United States Patent [19]

Shaw

[11] Patent Number: 4,810,364

[45] Date of Patent: Mar. 7, 1989

[54] HYDROTREATING PROCESS AND CATALYST

[75] Inventor: James E. Shaw, Bartlesville, Okla.

[73] Assignee: Phillips Petroleum Company, Bartlesville, Okla.

[21] Appl. No.: 177,742

[22] Filed: Mar. 15, 1988

[51] Int. Cl.$^4$ .............................................. C10G 35/08
[52] U.S. Cl. ............................. 208/254 H; 208/108; 208/209; 208/208 R; 208/213
[58] Field of Search ........................ 502/182; 585/469; 208/254 H, 208 R, 209, 213, 249, 295, 299, 108

[56] References Cited

U.S. PATENT DOCUMENTS

| | | | |
|---|---|---|---|
| 2,776,247 | 1/1957 | Anhorn et al. ...................... | 502/182 |
| 3,236,765 | 2/1966 | Erbelding ........................... | 208/254 |
| 3,383,306 | 5/1968 | Rogers et al. ...................... | 208/254 |
| 3,446,865 | 5/1969 | Roth et al. ......................... | 260/669 |
| 4,197,188 | 4/1980 | Antos .................................. | 208/139 |
| 4,250,020 | 2/1981 | Antos .................................. | 208/139 |
| 4,324,647 | 4/1982 | Gardner .............................. | 208/111 |
| 4,376,698 | 3/1983 | Gardner et al. ................... | 208/215 |
| 4,447,665 | 5/1984 | Wennerberg ...................... | 502/182 |
| 4,655,906 | 4/1987 | Bjornson et al. .................. | 208/217 |

Primary Examiner—Glenn Caldarola
Attorney, Agent, or Firm—K. K. Brandes

[57] ABSTRACT

A feed which comprises at least one aromatic compound containing chemically bound nitrogen and/or oxygen and/or sulfur is hydrotreated in the presence of a carbon-supported rhenium catalyst.

20 Claims, No Drawings

HYDROTREATING PROCESS AND CATALYST

BACKGROUND OF THE INVENTION

In one aspect, this invention relates to a hydrotreating process for removing nitrogen from aromatic nitrogen-containing compounds. In another aspect, this invention relates to a hydrotreating process for removing oxygen from aromatic oxygen-containing compounds. In a further aspect, this invention relates to a hydrotreating process for removing sulfur from aromatic sulfur-containing compounds.

Hydrotreating processes for removing nitrogen and/or oxygen and/or sulfur from aromatic compounds in the presence of supported rhenium catalysts are known. In these processes, the hydrogenation of these aromatic compounds results not only in the hydrogenation of nitrogen- and/or oxygen- and/or sulfur-containing aromatic rings and bonds but also in extensive hydrogenation of the aromatic hydrocarbon ring systems, and thus results in undesirably high hydrogen consumption. The hydrotreating process of this invention is more selective to aromatic hydrocarbon products and results in lower hydrogen consumption, thus being more economical, than prior art processes.

SUMMARY OF THE INVENTION

It is an object of this invention to provide a process for hydrotreating a feed which comprises aromatic nitrogen-containing compounds so as to remove at least a portion of nitrogen therefrom. It is another object of this invention to provide a process for hydrotreating a feed which comprises aromatic oxygen-containing compounds so as to remove at least a portion of oxygen therefrom. It is a further object of this invention to provide a process for hydrotreating a feed which comprises aromatic sulfur-containing compounds so as to remove at least a portion of sulfur therefrom. Other objects and advantages will be apparent from the detailed description and the appended claims.

In accordance with this invention, a hydrotreating process comprises contacting (a) a feed comprising at least one aromatic compound, which contains hydrogen, carbon and also at least one chemically bound element selected from the group consisting of nitrogen, oxygen and sulfur, with (b) a free hydrogen-containing gas, and (c) a catalyst composition comprising (i) rhenium metal or at least one rhenium compound or a mixture thereof and (ii) carbon as particulate solid support material, under such hydrotreating conditions as to remove at least a portion of the above-listed chemically bound element (or elements) from said feed.

DETAILED DESCRIPTION OF THE INVENTION

Any feed which comprises aromatic nitrogen and/or oxygen and/or sulfur compounds and is substantially liquid at the hydrotreating conditions of the process of this invention can be employed. Suitable aromatic feed compounds include: unsubstituted amines, alkyl and/or cycloalkyl-substituted amines, quinolines, isoquinolines, hydroquinolines, benzoquinolines, dibenzoquinolines, indoles, indolines, carbazoles, benzocarbazoles, dibenzocarbazoles, phenolic compounds (such as unsubstituted and alkyl-substituted phenols, catechol, hydroquinone, resorcinol and the like), naphthols, benzofurans, dibenzofurans, thiophenols (mercaptans), benzothiophenes, dibenzothiophenes, and the like, and mixtures containing two or more of the above-cited compounds. Presently preferred feed compounds are aniline and alkyl-substituted aniline (in particular 2-ethylaniline), quinoline, 1,2,3,4-tetrahydroquinoline, indoline, phenol, 3-ethylphenol and thiophenol.

The feeds can be substantially pure feed compounds, as described above, or can be solutions, employing solvents such as hydrocarbon-containing liquids, e.g., paraffins, cycloparaffins, aromatic hydrocarbons, partially hydrogenated aromatics, crude oil, crude oil fractions (e.g., naphtha, gas oil, cycle oil, residua), petroleum products, extracts of heavy oils, liquid extracts of coal (including lignite), liquefied coal products, liquid products from tar sand and shale oil, and the like. Particularly preferred solvents are those that act as hydrogen donors, such as tetralin, xylenes, toluene, durene, cyclohexylbenzene, 9,10-dihydrophenanthrene, and the like.

When solutions of N-containing compounds are employed, generally the nitrogen content is in the range of from about 0.01 to about 10 weight-% N. When solutions of oxygen-containing compounds are employed, generally the oxygen content is in the range of from about 0.01 to about 10 weight-% O. When solutions of sulfur-containing compounds are employed, generally the sulfur content is in the range of from about 0.01 to about 10 weight-% S. If a hydrogen donor solvent is used, generally the weight ratio of H-donor solvent to aromatic feed compound is in the range of from about 0.1:1 to about 200:1.

Any suitable rhenium-on-carbon catalyst composition can be employed in the process of this invention. Preferably, the catalyst composition consists essentially of components (i) and (ii), as defined above. The carbon support material can be any suitable porous carbon material, such as activated carbon or charcoal or carbon black. The support material can be granules, pellets, tablets, cylinders or irregularly shaped particles. Many of these carbon materials are used as water-treating agents and are described in the literature (such as in "Kirk-Othmer's Encyclopedia of Chemical Technology", Third Edition, Volume 4, 1978, John Wiley and Sons, Inc.; pages 561–569). Generally the surface area (measured by the BET/nitrogen method) of these carbon support materials is in excess of about 100 $m^2/g$.

The catalyst composition employed in the process of this invention can be prepared in any suitable manner, such as by impregnation of the carbon support material with a solution of a suitable Re compound and drying (preferably in air at about 200°–300° F., preferably for about 0.1–5 hours). Preferably, the catalyst composition is then heated in a reducing gas atmosphere, preferably in hydrogen (e.g., at a $H_2$ pressure of about 100–2000 psia, at about 600°–800° F., for about 0.5–5 hours). The Re/C catalyst composition generally contains Re substantially in the zero valence state under the hydrotreating conditions of this invention.

Preferred physical parameters of the catalyst composition comprise a surface area (measured by the BET adsorption method using nitrogen gas) of about 300–5,000 $m^2/g$ (most preferably about 800–1,200 $m^2/g$). The rhenium content in the catalyst generally is about 0.1–20 weight-% Re, and preferably is about 2–8 weight-% Re. It is understood that other transition metals may be present in the catalyst composition, as long as they do not adversely affect the hydrotreating activity of the catalyst composition. Prior to its use, the catalyst composition may be presulfided, i.e., treated with a sulfur compound either gaseous or liquid. However, presulfiding is not preferred when N-containing and O-containing aromatic feed compounds are used.

Any suitable hydrotreating conditions can be employed in the process of this invention. The free hydrogen-containing gas can be substantially pure hydrogen gas (presently preferred), or can be a mixture of $H_2$ and other gases such as CO, $N_2$, $CH_4$, $C_2H_6$ and the like. The hydrotreating temperature generally is in the range of from about 500° to about 850° F. (preferably about 650°–750° F.). The hydrotreating pressure generally is in the range of from about 1 to about 2000 psig (preferably 100–600 psig). The time of contact between feed, free hydrogen containing gas and catalyst composition generally is in the range of from about 1 minute to about 20 hours (preferably about 0.5–8 hours). The weight ratio of feed (including solvent when present) to catalyst composition generally is in the range of from about 0.1:1 to about 1000:1 (preferably about 10:1 to about 200:1).

The hydrotreating process can be carried out in any suitable manner and in any suitable apparatus. The process can be carried out as a batch process, e.g., in a stirred autoclave to which the process ingredients are added in any suitable order. Or the process can be carried out continuously, such as in a fixed catalyst bed reactor through which feed and hydrogen-containing gas flow if any direction (up or down); or alternatively, in a stirred vessel through which the hydrogen-containing gas and a slurry of feed and dispersed catalyst composition flow. The hydrotreated product (containing less nitrogen and/or oxygen and/or sulfur then the feed) can be separated by any suitable means, such as flashing or fractional distillation, into desired product components, such as solvent (which can be recycled to the reactor), light (i.e., volatile) products (such as $NH_3$, $H_2S$, $H_2O$) and liquid aromatic hydrocarbon products.

The following examples are presented to further the invention and are not to be construed as unduly limiting the scope of this invention.

EXAMPLE I

In this example rhenium-containing catalysts, which were used in hydrotreating tests, are described.

Invention Catalyst A was carbon-supported rhenium catalyst was provided by Aldrich Chemical Company, Milwaukee, Wis. Catalyst A contained 5 weight-% Re. The surface area of Catalyst A, determined by nitrogen adsorption in accordance with the BET (Brunauer, Emmett, Teller) method, was 900–950 m²/g. As indicated by x-ray photoelectron spectrometry at 360° C. under hydrogen, Re was present in the zero oxidation state at these conditions. It is thus concluded that Re in Catalyst A was in the zero valence state during hydrotreating tests described in Examples II–VI.

Control Catalyst B was an alumina-supported rhenium catalyst, which contained 5 weight-% Re and had a surface area (determined by $N_2$/BET method) of about 100 m²g. Catalyst B was obtained from Strem Chemicals, Inc., Newburyport, Mass.

Control Catalyst C was a zinc titanate-supported rhenium catalyst which contained 5 weight-% Re and had a surface area of 6 m²/g. Catalyst C was prepared by impregnation of zinc titanate with an aqueous solution of $HReO_4$, drying, calcining in air at 900° F. for about 3 hours, and heating in hydrogen (1,000 psi) at 752° F. for 2–3 hours.

Control Catalyst D was a zeolite-supported rhenium catalyst which contained 5 weight-% Re. It was prepared substantially in accordance with the preparation of Catalyst C except that zeolite was used as support material.

EXAMPLE II

This example illustrates the hydrodenitrogenation of an aromatic amine in the presence of supported Re catalysts.

To a 300 cc stainless steel autoclave equipped with stirrer (provided by autoclave Engineers) were added 3.5 grams 2-ethylaniline, 66.5 grams of n-hexadecane as solvent (substantially free from sulfur) and 0.35 grams of one of the catalysts described in Example I (in powdered form; particle size; less than 325 mesh). The autoclave was pressured with hydrogen, stirred, and vented. This deaeration procedure was repeated four more times. The autoclave was then pressured with hydrogen gas to 80 psig, heated with rapid stirring (1100 RPM) to 662° F. (350° C.) within 30 minutes, and maintained at this temperature for about 4 hours.

The autoclave was then cooled. The contents of the autoclave were suction-filtered, and the filtrate was analyzed by means of a Perkin-Elmer 3920B gas chromatograph, which was equipped with a flame detector and a stainless steel column (6 ft. long, ⅛ inch diameter) filled with 10 weight-% Carbowax 20M on Chromasorb. GC tests were carried out at a column temperature of 150° C. Test results are summarized in Table I.

TABLE I

| Run | Catalyst | Reaction Time (Hr.) | % Conversion to Hydrocarbons | % Selectivity to Hydrocarbons Aromatic[2] | Saturated |
| --- | --- | --- | --- | --- | --- |
| 1 (Invention) | A | 4.3 | 4 | 45 | 55 |
| 2 (Control) | B | 4.6 | 6 | 39 | 61 |
| 3 (Control) | C | 4.0 | 3 | 33 | 67 |
| 4 (Control) | D | 3.5 | 2 | 13 | 87 |

[1]equal to % removal of nitrogen
[2]about 90% or more of the aromatic hydrocarbon fraction was ethylbenzene; the remainder was toluene and benzene Test results in Table I indicate that invention Catalyst A (Re/C) was more selective to aromatics and less selective to undesirable saturates (which required more hydroen) than the three control catalysts (RE/$Al_2O_3$, Re/$Zn_2TiO_4$ and Re/zeolite). Based on these results, it is concluded that the hydrodenitrogenation (HDN) of the feed, 2-ethylaniline (1-amino-2-ethylbenzene), with Re/C as catalyst occurred at a lower hydrogen consumption per mole of converted feed than HDN employing other supported Re catalysts.

EXAMPLE III

This example illustrates the use of rhenium-containing catalysts in hydrodenitrogenation tests in the presence of a hydrogen donor solvent.

0.50 grams of 2-ethylaniline, 69.5 grams of tetralin (as H donor solvent), and 0.50 grams of one of the Re-containing catalysts described in Example II were introduced in a 300 cc stainless steel autoclave. Deaeration, heating and analysis of the reactor contents were carried out substantially in accordance with the procedure described in Example II. Test results are summarized in Table II.

TABLE II

| Run | Catalyst | Reaction Temp. (°C.) | Reaction Time (Hrs.) | % Conversion to Hydrocarbons[1] | % of Selectivity to Hydrocarbons | |
|---|---|---|---|---|---|---|
| | | | | | Aromatics[2] | Saturates |
| 5 (Invention) | A | 350 | 4 | 2 | 80 | 20 |
| 6 (Invention) | A | 350 | 5 | 20 | 78 | 22 |
| 7 (Control) | B | 350 | 3 | 7 | 54 | 46 |
| 8 (Control) | B | 350 | 4 | 1 | 51 | 49 |
| 9 (Control) | C | 350 | 4 | 3 | 33 | 67 |
| 10 (Invention) | A | 375 | 2 | 26 | 77 | 23 |
| 11 (Invention) | A | 375 | 5 | 85 | 73 | 27 |
| 12 (Invention) | B | 375 | 5 | 23 | 50 | 50 |

[1]equal to % removal of nitrogen
[2]comprising ethylbenzene, toluene and benzene Test results in Table II confirm the results in Table I: Re/C was more selective to aromatic hydrocarbons than Re/Al$_2$O$_3$ and Re/ZnTiO$_4$. Furthermore, a comparison of results of Run 1 (Table I) and Run 5 (Table II), both obtained at 350° C., indicate that higher conversion to hydrocarbons (i.e., higher degree of % removal of N) was attained with tetralin as solvent (which is a known hydrogen donor solvent). Conversion (i.e. degree of removal of nitrogen) was considerably increased by raising the reaction temperature from 350° C. to 375° C.

EXAMPLE IV

This example illustrates the hydrodenitrogenation of various heterocyclic nitrogen compounds in the presence of a carbon-supported rhenium catalyst and tetralin as solvent. Tests were carried out substantially in accordance with the procedure described in Examples II and III, except that 0.5 grams of the nitrogen compound and 1.0 gram of Catalyst A (Re/C) were used. Test results are summarized in Table III.

TABLE III

| Run[1] | Reaction Temp. (°C.) | Reaction Time (Hr.) | Nitrogen Compound | % Conversion[2] to Hydrocarbons | % Selectivity to Hydrocarbons | |
|---|---|---|---|---|---|---|
| | | | | | Aromatics[3] | Saturates |
| 13 | 360 | 5.5 | 1,2,3,4-Tetrahydroquinoline | 36 | 78 | 22 |
| 14 | 365 | 5.0 | 1,2,3,4-Tetrahydroquinoline | 33 | 76 | 24 |
| 15 | 365 | 6.0 | 1,2,3,4-Tetrahydroquinoline | 91 | 68 | 32 |
| 16 | 360 | 5.0 | Quinoline | 19 | 78 | 22 |
| 17 | 365 | 5.0 | Quinoline | 26 | 77 | 23 |
| 18 | 365 | 6.5 | Quinoline | 85 | 69 | 31 |
| 19 | 365 | 4.0 | Indoline | 40 | 87 | 13 |
| 20 | 365 | 5.5 | Indoline | 98 | 77 | 23 |

[1]all runs were carried out with Catalyst A (Re/C) and tetralin as solvent; employing 80 psi H$_2$ initial pressure (measuring temperature)
[2]equal to % nitrogen removal
[3]comprising n-propylbenzene, ethylbenzene, toluene and benzene Test data in Table III show that Catalyst A (Re/C) was quite effective in hydrodenitrogenation various heterocyclic compounds, at good conversion (degree of nitrogen removal) and high selectivity to aromatic hydrocarbons.

EXAMPLE V

This example illustrates the removal of oxygen from phenols and sulfur from aromatic mercaptans (thiophenols), in the presence of Catalyst A (Re/C), 80 psi H$_2$ (measured at room temperature) and tetralin as solvent. Tests were carried out substantially in accordance with the procedure described in Examples II and III except that 0.75 grams of the phenol or thiophenol and 0.5 grams of Catalyst A were used. Test results are summarized in Table IV.

TABLE IV

| Run[1] | Reaction Temp. (°C.) | Reaction Time (Hr.) | Hydrotreated Compound | % Conversion[2] to Hydrocarbons | % Selectivity to Hydrocarbons | |
|---|---|---|---|---|---|---|
| | | | | | Aromatics[3] | Saturates |
| 21 | 340 | 1 | 3-Ethylphenol | 53 | 91 | 9 |
| 22 | 340 | 2.3 | 3-Ethylphenol | 82 | 81 | 19 |
| 23 | 350 | 4 | Phenol | 50 | 70 | 30 |
| 24 | 350 | 4 | Thiophenol | 41 | 99 | 1 |

[1]all runs were carried out with Catalyst A (Re/C) and tetralin as solvent; employing 80 psi $H_2$ (measured at room temperature).
[2]equal to % oxygen removal and % sulfur removal, respectively.
[3]comprising 95-99% ethylbenzene in runs 21 and 22, and about 100% benzene in runs 23 and 24.

Test results in Table IV indicate that phenols and thiophenols were converted to hydrocarbons at higher conversion and high selectivity to aromatic hydrocarbons, by hydrogenation in the presence of Re/C as catalyst and tetralin as solvent.

EXAMPLE VI

This example illustrates the effect of sulfur on the catalytic activity and selectivity of Catalyst A (Re/C). Catalyst A had been presulfided in several runs. Presulfiding was carried out as follows: Tetralin (69.5 g) and 5% Re/C (0.5 g) were placed in an antoclave which was flushed with $H_2$ as described before. Then 0.6 cc of carbon disulfide was added by means of a syringe through a port. The autoclave was pressured to 400 psi with $H_2$ and heated at 350° C. for 2 hours with stirring (so as to generate $H_2S$). After cooling and bleeding off $H_2$, 0.5 ml of 2-ethylaniline (or another substrate) was added through the port, the antoclave was pressured to 80 psi $H_2$ (at room temperature), and heated to 350° C. Test results were obtained in accordance with the procedure described in Examples III-V and are summarized in Table V.

TABLE V

| Run | Reaction Temp. (°C.) | Reaction Time (Hrs.) | Hydrotreated Compound | Catalyst Presulfided | % Conversion to Hydrocarbons | % Selectivity to Hydrocarbons | |
|---|---|---|---|---|---|---|---|
| | | | | | | Aromatics | Saturates |
| 2 | 350 | 5 | 2-Ethylaniline | no | 20 | 78 | 22 |
| 25 | 350 | 5 | 2-Ethylaniline | yes | 30 | 24 | 76 |
| 23 | 340 | 4 | Phenol | no | 50 | 70 | 30 |
| 26 | 340 | 4 | Phenol | yes | 12 | 21 | 79 |
| 24 | 350 | 4 | Thiophenol | no | 41 | 99 | 1 |
| 27 | 350 | 4 | Thiophenol | yes | 38 | 100 | 0 |

Test results in Table V indicate that the hydrogenation of an aromatic nitrogen compound and of aromatic oxygen compound was adversely affected by exposure of the Re/C catalyst to sulfur: the selectivity to desirable aromatic hydrocarbons was dramatically lowered. Thus, sulfur compounds should be substantially absent during the hydrodenitrogenation and hydrodeoxygenation of aromatic compounds in the presence of a Re/C catalyst. On the other hand, exposure of the Re/C catalyst to sulfur had no significant adverse effect on hydrodesulfurization, in particular the selectivity to aromatic hydrocarbons.

Reasonable variations, modifications and adaptations for various usages and conditions can be made within the scope of the disclosure and the appended claims, without departing from the scope of this invention.

That which is claimed is:

1. A hydrotreating process which comprises contacting
   (a) a feed comprising at least one aromatic compound, which contains hydrogen, carbon and at least one chemically bound element selected from the group consisting of nitrogen, oxygen and sulfur, with
   (b) a free hydrogen-containing gas, and
   (c) a catalyst composition comprising (i) at least one substance selected from the group consisting of rhenium metal and rhenium compounds and (ii) carbon as particulate support material,
   under such hydrotreating conditions as to remove at least a portion of said at least one chemically bound element from said feed;
   wherein said at least one aromatic compound is selected from the group consisting of amines, quinolines, isoquinolines, hydroquinolines, benzoquinolines, dibenzoquinolines, indoles, indolines, carbazoles, benzocarbazoles, dibenzocarbazoles, phenols, catechol, hydroquinone, resorcinol, naphthols, benzofurans, dibenzofurans, thiophenols, benzothiophenols and dibenzothiophenols.

2. A process in accordance with claim 1, wherein said feed contains about 0.01-10 weight-% N.

3. A process in accordance with claim 1, wherein said at least one aromatic compound is selected from the group consisting of amines, quinolines, isoquinolines, hydroquinolines, benzoquinolines, dibenzoquinolines, indoles, indolines, carbazole, benzocarbazoles and dibenzocarbazoles.

4. A process in accordance with claim 1, wherein said at least one aromatic compound is selected from the group consisting of 2-ethylaniline, quinoline, 1,2,3,4-tetrahydroquinoline and indoline.

5. A process in accordance with claim 4 wherein said at least one aromatic compound is dissolved in tetralin.

6. A process in accordance with claim 1, wherein said feed contains about 0.01-10 weight-% O.

7. A process in accordance with claim 1, wherein said at least one aromatic compound is selected from the group consisting of phenols, catechol, hydroquinone, resorcinol, naphthols, benzofurans and dibenzofurans.

8. A process in accordance with claim 1, wherein said at least one aromatic compound is selected from the group consisting of phenol and 2-ethylphenol.

9. A process is accordance with claim 8, wherein said at least one aromatic compound is dissolved in tetralin.

10. A process in accordance with claim 1, wherein said feed contains about 0.01–10 weight-% S.

11. A process in accordance with claim 1, wherein said at least one aromatic compound is selected from the group consisting of thiophenols, benzothiophenols and dibenzothiophenols.

12. A process in accordance with claim 1, wherein said at least one aromatic compound is thiophenol.

13. A process in accordance with claim 12, wherein thiophenol is dissolved in tetralin.

14. A process in accordance with claim 1, wherein said catalyst composition comprises about 0.1 to about 17 weight-% Re.

15. A process in accordance with claim 14, wherein said catalyst composition comprises about 2–8 weight-% Re, and has a surface area of about 800–1200 m²/g.

16. A process in accordance with claim 1, wherein said hydrotreating conditions comprise a temperature in the range of from about 500° to about 850° F., a pressure in the range of from about 1 to about 2,000 psig, a time of contact between (a), (b) and (c) in the range of from about 1 minute to about 20 hours, and a weight ratio of said feed to said catalyst composition in the range of from about 0.1:1 to about 1000:1.

17. A process in accordance with claim 1, wherein said hydrotreating conditions comprise a temperature in the range of from about 650° to about 750° F., a pressure in the range of from about 100 to about 600 psig, a time of contact between (a), (b) and (c) in the range of from about 0.5 to about 8 hours, and a weight ratio of said feed to said catalyst composition in the range of from about 10:1 to about 200:1.

18. A process in accordance with claim 1, wherein said feed additionally contains a hydrogen donor solvent selected from the group consisting of tetralin, toluene, xylenes, durene, cyclohexylbenzene and 9,10-dihydrophenanthrene.

19. A process in accordance with claim 18, wherein the weight ratio of said hydrogen donor solvent to said at least one aromatic compound is in the range of from about 0.1:1 to about 200:1.

20. A process in accordance with claim 1, wherein said catalyst composition consists essentially of components (i) and (ii).

* * * * *

UNITED STATES PATENT AND TRADEMARK OFFICE
CERTIFICATE OF CORRECTION

PATENT NO. : 4,810,364

DATED : March 7, 1989

INVENTOR(S) : James E. Shaw

It is certified that error appears in the above-identified patent and that said Letters Patent is hereby corrected as shown below:

Claim 14, column 9, line 14, delete "17" and substitute --- 20 --- therefor.

Signed and Sealed this

Ninth Day of January, 1990

Attest:

JEFFREY M. SAMUELS

Attesting Officer      Acting Commissioner of Patents and Trademarks